United States Patent
Dehrmann et al.

(10) Patent No.: US 7,040,269 B2
(45) Date of Patent: May 9, 2006

(54) METHOD FOR OPERATING A DRIVE WITH AN INTERNAL COMBUSTION ENGINE AND AN ELECTRIC MACHINE

(75) Inventors: Uwe Dehrmann, Würzburg (DE); Marco Falco, Würzburg (DE); Hans-Peter Johanning, Steinbach (DE)

(73) Assignee: Siemens Aktiengesellschaft, München (DE)

( * ) Notice: Subject to any disclaimer, the term of this patent is extended or adjusted under 35 U.S.C. 154(b) by 161 days.

(21) Appl. No.: 10/363,113

(22) PCT Filed: Aug. 16, 2001

(86) PCT No.: PCT/EP01/09474

§ 371 (c)(1),
(2), (4) Date: Apr. 16, 2003

(87) PCT Pub. No.: WO02/18169

PCT Pub. Date: Mar. 7, 2002

(65) Prior Publication Data

US 2003/0196631 A1 Oct. 23, 2003

(30) Foreign Application Priority Data

Aug. 28, 2000 (EP) .............................. 00118614

(51) Int. Cl.
*B60L 11/14* (2006.01)

(52) U.S. Cl. .............................. 123/142.5 R
(58) Field of Classification Search .......... 123/142.5 R, 123/142.5 E, 41.33, 41.17; 290/51, 40 B, 290/40 C See application file for complete search history.

(56) References Cited

U.S. PATENT DOCUMENTS

| | | | | | |
|---|---|---|---|---|---|
| 4,354,466 A | * | 10/1982 | Dudley et al. | ......... | 123/339.18 |
| 4,766,862 A | * | 8/1988 | Hibino et al. | .......... | 123/339.18 |
| 5,545,928 A | * | 8/1996 | Kotani | .................... | 290/40 C |
| 5,621,304 A | * | 4/1997 | Kiuchi et al. | .................. | 322/18 |
| 5,638,774 A | * | 6/1997 | Albertson et al. | ....... | 123/41.33 |
| 5,784,878 A | * | 7/1998 | Kato et al. | .................... | 60/274 |
| 5,808,367 A | * | 9/1998 | Akagi et al. | .............. | 290/40 C |
| 6,057,605 A | * | 5/2000 | Bourne et al. | ............ | 290/40 C |
| 6,320,274 B1 | | 11/2001 | Goetze et al. | ............... | 307/9.1 |
| 6,459,166 B1 | * | 10/2002 | Yanase et al. | ............ | 290/40 C |
| 6,573,614 B1 | * | 6/2003 | Doll | ........................ | 290/40 C |
| 6,657,315 B1 | * | 12/2003 | Peters et al. | ............. | 290/40 C |

FOREIGN PATENT DOCUMENTS

| | | |
|---|---|---|
| DE | 197 52 661 A1 | 6/1999 |
| DE | 198 01 542 A1 | 7/1999 |
| JP | 112 23 140 | 8/1999 |
| WO | WO 9708456 | 3/1997 |

* cited by examiner

*Primary Examiner*—Henry C. Yuen
*Assistant Examiner*—Jason Benton
(74) *Attorney, Agent, or Firm*—Cohen, Pontani, Lieberman & Pavane

(57) ABSTRACT

The warm-up period of the internal combustion engine is reduced by operating an electric machine as an additional load of the combustion engine in order to obtain a specific excessive increase in the heat loss of combustion engine. To this end, the magnetizing current of the electric machine such as, for example, a starter generator with field-oriented regulation, can be regulated in order to obtain a specific decrease in the degree of efficiency of the electric machine.

12 Claims, 1 Drawing Sheet

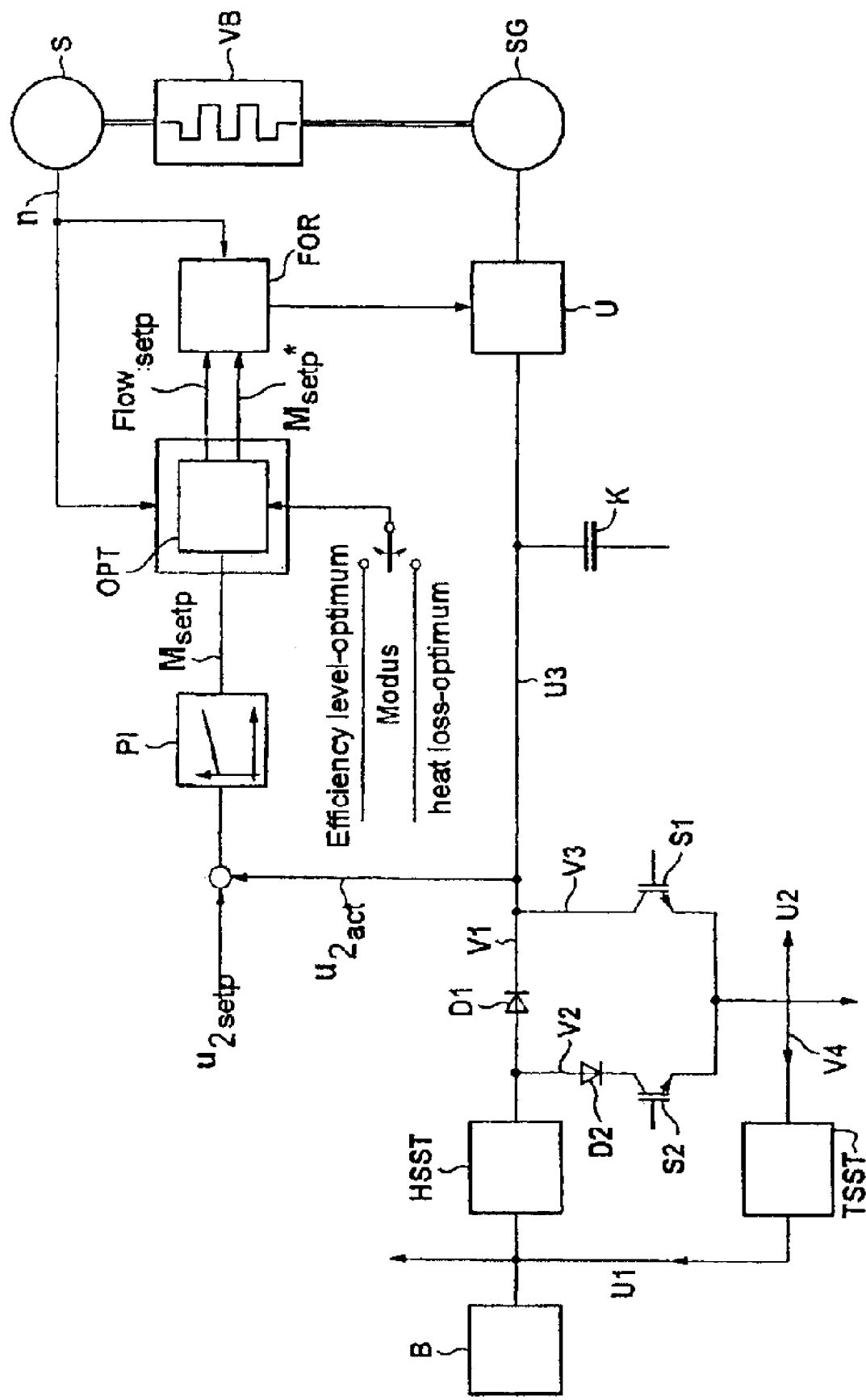

METHOD FOR OPERATING A DRIVE WITH AN INTERNAL COMBUSTION ENGINE AND AN ELECTRIC MACHINE

PRIORITY CLAIM

This is a national stage of PCT application No. PCT/EP01/09474, filed on Aug. 16, 2001. Priority is claimed on that application and on Application No. EP 00118614.7, filed in Europe on Aug. 28, 2000.

BACKGROUND OF THE INVENTION

1. Field of the Invention

The invention relates to a method for operating a drive with an internal combustion engine and an electric machine.

2. Description of the Prior art

DE 197 52 661 A1 describes an on-board power system for a motor vehicle with a combined drive including an electric machine and an internal combustion engine which act on the same drive train. On the one hand, the electric machine supports, for example, the starting process of the internal combustion engine as a motor and, on the other hand, outputs charge power to a vehicle operating battery, and possibly to an additional short-term starting capacitor, as a generator. In order to be able to operate with the highest possible efficiency and thus with the lowest possible loading of the energy stores or energy supply means in the generator operating mode, the electric losses both in the converter and in the asynchronous machine which is provided for the starter-generator are advantageously kept low. This is accomplished by virtue of the fact that, in a field-oriented control, the internal torque of the asynchronous machine of the start-generator is set according to the principle of controlling or regulating the rotor flow with optimum loss by correspondingly adapting the magnetizing current as a function of an active current which is determined in accordance with the respectively required drive torque.

SUMMARY OF THE INVENTION

The object of the present invention is to reduce further the environmental stress of a combined drive with mixed electric motor/internal combustion engine, in particular of a motor vehicle with a corresponding hybrid drive, using a simple cost effective device.

Taking as a starting point the fact that a shortened warming-up phase can reduce the fuel consumption and the stressing of the environment by exhaust gases, the electric machine is used, preferably in the cold-starting operating mode, as an additional load on the internal combustion engine in order to excessively increase its heat loss selectively in comparison to a customary driving operating mode. In this way the internal combustion engine more quickly reaches its optimum operating point which is characterized by low consumption and low stressing of the environment by exhaust gases. When there is a correspondingly cool external temperature, the interior of a motor vehicle can at the same time be heated up more quickly while dispensing with a separate additional heater.

Given selective operation of the internal combustion engine outside its optimum operating point, the heat loss which occurs in the electronics which correspondingly control the electric machine can also be used in particular to heat up the interior of a motor vehicle which is driven by the drive.

According to the method of the present invention, the additional load can be obtained by a corresponding charge power which is output by the electric machine operating in the generator operating mode to an operating battery, preferably to a main battery which ensures the basic electric power supply in a motor vehicle.

If such an additional load cannot be conducted away in the form of a battery charge load, for example owing to the state of charge of the battery, the method according to the invention also provides for the electric machine to be operated with a respectively degraded level of efficiency in comparison with the optimum level of efficiency on the basis of the set point drive torque and rotational speed. The additional heat which is produced here in the electric machine itself can advantageously be used to heat up the internal combustion engine and/or for additional heating of the interior of the motor vehicle.

A setting of a level of efficiency of the electric machine which is intentionally degraded can be achieved, for example in an asynchronous machine with field-oriented control of the magnetic current, known per se from DE 197 52 661 A1, by selectively changing the magnetizing current from the optimal value which is aimed at to minimize the electrical losses in the known case.

BRIEF DESCRIPTION OF THE DRAWINGS

In the Drawing:

FIG. 1 is a schematic diagram of an on-board power system of a vehicle.

DETAILED DESCRIPTION OF THE PRESENTLY PREFERRED EMBODIMENTS

The figure shows a drive based on the vehicle on-board power system known from DE 197 52 661 A1. The drive for a motor vehicle is a hybrid drive with an internal combustion engine VB and an electric machine in the form of an asynchronous machine as a starter-generator SG with field-oriented control.

The vehicle on-board power system illustrated in the figure can basically be divided into a first vehicle on-board power system component U1 with a voltage level of, for example, 12 volts corresponding to the voltage of the battery B, a second vehicle on-board power system component U2 for supplying high-power loads with a voltage level of, for example, 180 volts, and a third vehicle on-board power system component U3 with a voltage level of for example 400 volts for charging a starting capacity K for starting an internal combustion engine VB using a starter-generator SG which can be fed via a converter U. The third vehicle on-board power system component U3 is also used in the generator operating mode of the starter-generator SG to adapt its output voltage of approximately 180 volts, set by means of the converter U, to the voltage level of the second vehicle on-board power system component U2. A control component is used for power-optimum operation of the asynchronous machine, which is provided as a starter-generator SG, preferably with a squirrel-cage rotor.

During preparation for starting of the internal combustion engine VB by means of the starter-generator SG, which then operates as an asynchronous motor, for example after the ignition key is activated, a starter capacitor K in the third on-board power system component U3 is charged to a voltage of approximately 400 volts via the connection V1 using step-up controller (DC/DC converter) HSST. Switches S1 and S2 in the connection V2 or V3, respectively, are opened during this charging phase of the starting capacitor K. The connection V1 is blocked in the opposite direction to the battery B by a diode D1 in the connection V1.

During the actual starting process, the internal combustion engine VB can be accelerated to a rotational speed of approximately 400 to 700 rpm using the asynchronous motor of the starter generator SG. If the internal combustion engine VB includes electronic valve control, the valves are opened during the acceleration and thus set to a compressionless state. As soon as the internal combustion engine VB has reached an anticipated rotational speed or the necessary angle of rotation of its crankshaft, the internal combustion engine VB can be fired with the normal valve position and the starter-generator SG can be switched off at the drive end. If the energy which has been previously stored in the starter capacitor K is not sufficient for the starting process, energy can be additionally drawn from the battery B via the step-up controller (DC/DC converter) HSST and the connection V1 for the starter-generator SG fed via the converter U if the voltage level of the third vehicle on-board power system component U3 falls below the voltage level of the second vehicle on-board power system component U2.

After the firing process of the internal combustion engine VB, the starter-generator SG may switch to the generator operating mode. Here, the voltage level of the third vehicle on-board power system component U3 is adjusted, as intermediate circuit voltage, to the voltage level of the second vehicle on-board power system component U2 of for example 180 volts by the converter U and the starter capacitor K which is expediently used as an intermediate circuit capacitor.

After the voltage level of the vehicle on-board power system component U2 has been reached, switches S1 and S2 are arranged so that the switch S2 is opened and the connection V2 thus disconnected and the switch S1 closed so that the connection V3 from the vehicle on-board power system component U3 to the vehicle on-board power system component U2 is brought about. The step-up controller (DC/DC converter) HSST is expediently deactivated. The starter-generator SG then operates in the generator operator mode and supplies the vehicle on-board power system component U2, and the high-power loads connected to it, via the regulated intermediate circuit voltage of the vehicle on-board power system component U3.

To operate in the generator operating mode of the starter-generator SG with the highest possible level of efficiency and thus with the lowest possible loading of the energy stores or energy supplying means, the electrical losses both in the converter U and in the asynchronous machine which is provided for the starter-generator SG are advantageously kept low by virtue of the fact that in a field-oriented control FOR the internal torque $M_{i1}$ of the asynchronous machine of the starter-generator SG is set according to the principle of controlling or regulating the rotor flow with optimum loss by correspondingly adapting the magnetizing current as a function of an active current which is determined in accordance with the respectively required drive torque.

According to the present invention, an additional load of the internal combustion engine VB can be set in order to increase the feed loss of internal combustion engine in a selective fashion, in particular in order to shorten the warming-up phase. This may be accomplished by setting the magnetization current differently from the way previously provided according to DE 197 52 661 A1 in order to achieve an optimum level of efficiency. For this purpose, an optimizer OPT for switching over between a known operating mode with optimum level of efficiency on the one hand and an operating mode which differs from it according to the invention in order to excessively increase the heat loss is provided. A corresponding setpoint value for the field-oriented control FOR can be predefined by setting a corresponding setpoint torque $M_{setp}$ or a correspondingly magnetizing current $Flow_{setp}$. For the purpose of respectively controlling, in accordance with the rotational speed, the rotational speed of the internal combustion engine VB is transmitted both to the optimizer OPT and to the field-oriented control FOR via a rotational speed sensor S. The setpoint torque $M_{setp}$ may be determined based on the speed indicated by speed signal n. The setpoint torque $M_{setp}$ may also be determined from a database PI based on a difference between the actual voltage $U2_{act}$ of the second vehicle on-board power system U2 and the desired voltage $U2_{set\ up}$ thereof.

What is claimed is:

1. A method of operating a drive of a motor vehicle having an internal combustion engine and an electric machine, said method comprising the steps of:

(a) selectively operating the electric machine as a load on the internal combustion engine to increase a first heat loss associated with the internal combustion engine, wherein said step of selectively operating includes operating the electric machine as a generator with a reduced level of efficiency to generate a second heat loss from the electric machine.

2. The method of claim 1, wherein the electric machine is an asynchronous machine.

3. The method of claim 1, wherein said step (a) of selectively operating the electric machine as a load further includes selectively operating the electric machine as a generator to charge a battery associated with the vehicle.

4. The method of claim 3, wherein the battery is a power supply for the motor vehicle.

5. The method of claim 1, further including the step of:

(b) using the second heat loss from the electric machine to heat an interior of the motor vehicle.

6. The method of claim 1, wherein the electric machine is an asynchronous machine with a field-oriented control for setting a magnetizing current, the asynchronous machine being operable as a generator and having an optimal efficiency setting for the magnetizing current, said step (a) of selectively operating the electric machine as a load further including selectively operating the asynchronous machine as a generator with a magnetizing current that differs from the optimal setting.

7. The method of claim 1, wherein said step (a) of selectively operating the electric machine as a load further includes selectively operating the electric machine as a starter-generator.

8. The method of claim 1, wherein the drive of the motor vehicle is a hybrid drive, said method further including the step of:

(b) using the hybrid drive for driving the motor vehicle.

9. The method of claim 1, further including the step of:

(b) using the first heat loss to shorten a warm-up phase of the internal combustion engine.

10. The method of claim 9, further including the step of:

(c) using the first heat loss to heat an interior of the motor vehicle.

11. The method of claim 9, wherein said step (a) of selectively operating the electric machine as a load further includes operating the electric machine to increase a third heat loss from electronics of the electric machine, said method further including the step of:

(c) using the third heat loss to heat an interior of the vehicle.

12. A method of operating a drive of a motor vehicle having an internal combustion engine and an electric machine, comprising the steps of selectively operating the electric machine as a load on the internal combustion engine to increase a first heat loss by accelerating the internal combustion engine to a predetermined rotational engine speed and operating the electric machine as a generator with a reduced level of efficiency to generate a second heat loss from the electric machine.

* * * * *